United States Patent [19]

Hubbell

[11] 3,947,048

[45] Mar. 30, 1976

[54] SEGMENTED CIRCUMFERENTIALLY SPLIT COLLET PAD WITH REPLACEABLE SERRATIONS

[76] Inventor: Kenneth C. Hubbell, 12916 N. Linden Lane, Parma, Ohio 44130

[22] Filed: Apr. 17, 1974

[21] Appl. No.: 461,744

[52] U.S. Cl. ............... 279/41 A; 279/1 SJ; 279/123
[51] Int. Cl.² ........................................ B23B 5/22
[58] Field of Search ........ 279/41, 42, 1 SJ, 51, 123

[56] References Cited
UNITED STATES PATENTS

| | | | |
|---|---|---|---|
| 2,139,973 | 12/1938 | Russell | 279/123 X |
| 2,323,889 | 7/1943 | Zezula | 279/41 A |
| 2,421,563 | 6/1947 | Ingalls | 279/51 |
| 2,565,330 | 8/1951 | Sundt | 279/51 |
| 3,061,322 | 10/1962 | Pieper | 279/123 |
| 3,090,614 | 5/1963 | Freeman et al. | 279/123 |

Primary Examiner—Travis S. McGehee
Assistant Examiner—W. R. Briggs
Attorney, Agent, or Firm—Alfred D. Lobo

[57] ABSTRACT

A longitudinally sectioned collet pad having plural pad segments of the detachable type, such as are conventionally used in an expansible collet, is provided with a freely interchangeable liner for each pad segment. Fastening means secure each liner against the inner surface of an outer member of the pad segment, and hold the liner against movement, either circumferentially, or radially inwardly.

Liners for each pad segment are provided with a roughened inner surface, preferably with serrations, to grip a bar of stock by coaction of the pad segments. Interchangeability of liners obviates the need for integral pad segments, permits the use of liners for a wide range of stock diameters using the same outer members of the pad segments, and effects great economy in the manufacture and use of removable collet pads.

2 Claims, 4 Drawing Figures 3,947,048

SEGMENTED CIRCUMFERENTIALLY SPLIT COLLET PAD WITH REPLACEABLE SERRATIONS

BACKGROUND OF THE INVENTION

This invention relates to pads removably secured in resilient work-gripping jaws of a work-holding collet. The pads may be used in any suitable conventional collet adapted for use in metal working machines, including automatic or hand-operated screw machines, and the like, which are constructed especially for the purpose of feeding the work. More particularly, this invention relates to longitudinally sectioned collet pads consisting of at least two pad segments, which when removably secured in the jaws of the collet, coact to grip the work or stock extending through the collet, as is well-known in the art, as, for example, in an automatic screw machine. The particular subject matter which I regard as my invention is an improvement in the aforementioned collet pad segments such as are conventionally used, which improvement comprises a novel circumferentially split composite pad structure embodying a novel, yet defiantly simple concept.

The novel collet pad of my invention comprises at least two longitudinally sectioned composite pad segments each of which includes a removable and replaceable inner work-gripping liner snugly fitted to an outer member. The inner work-gripping liner may also be referred to as the inner pad member, or simply as the liner, and, the outer member as the outer pad member; since collet pads are generally cylindrical and are adapted to grip an elongated workpiece or bar of stock, the usual relationship of the inner liner to the outer member is as if the composite pad segments of my invention were circumferentially split, and the instant collet pad comprising at least two composite pad segments is referred to as a circumferentially split collet pad. As mentioned hereinabove, this circumferentially split collet pad is also longitudinally sectioned so that the composite pad segments of this invention are particularly designed for use in a radially expansible collet such as is disclosed in U.S. Pat. Nos. 1,573,048; 1,937,236; 2,689,740; 2,747,881; 2,951,707, inter alia.

Persons skilled in the art know, and will recognize from the foregoing references, that, over the past half a century or more, a great deal of effort has been expended towards improving the performance of both the collets and the collet pads used therein. These persons will also acknowledge the considerable and ever-increasing cost of fabricating conventional collet pads, and over the many years, have become accustomed to high-cost collet pads and enured to fabricating collet pads in the time-honored manner, as disclosed in the foregoing references, and summarized hereinbelow.

Conventionally, a billet of tool steel is machined to provide a desired outer configuration, including, for example, a circumferential rib intermediate the ends of that portion of the billet to be utilized as the pad. The rib is designed for engagement within a recess in the jaws of the collet. This integral pad is then provided with an axial bore of predetermined diameter, which is subsequently machined with highly specialized machine tools. Teeth are cut into the inner surface of the billet by cutting a multiplicity of circumferential grooves of predetermined depth and thereafter progressively slotting or broaching with a series of broaching tools of increasing diameter until the desired dimensions are obtained. Broaching typically provides the inner surface of the pad with serrations, teeth, or the like, which dig into the surface of the stock and grip it so tightly and securely that the stock may be subjected to a high-speed machining operation without budging. The integral pad is thereafter heat treated in a conventional way to obtain the desired hardness of the teeth of the pad; and the inner diameter and outer diameter of the pad are then finish ground. This integral cylindrical pad with a serrated inner surface is then longitudinally sectioned into two or more unitary longitudinal segments, which when reassembled, closely approximate the dimensions of the archetype integral pad. The dimensions will not be identical because of the missing material which is removed during cutting. Sectioning the finish ground integral pad is the final step.

The heat-treated segments of the pad are then assembled in a collet and removably secured therein by any of numerous known fastening means designed to operate under the particular stresses generated within such a collet during use.

From the foregoing it will be evident that the entire integral collet pad, and all longitudinal unitary segments thereof, are of the same material, usually a conventional tool steel; also, that a faulty machining operation, for example, broken serrations during broaching usually results in discarding the entire pad. It will also be apparent that, after a period of use during which the gripping serrations of the unitary segments have become unacceptably worn, all unitary segments of the pad must be replaced. In other words, though only the serrations may be badly worn, the entire pad assembly is usually discarded. In small pad assemblies the cost may not be unreasonable, but in larger pad assemblies, say for stock greater than about 5 cms. equivalent diameter, the cost over an extended period of time is enormous. More importantly, having to unpredictably discard a worn assembly of pads requires that several sets of replacement pads be prudently carried in inventory.

It will also be evident from the foregoing that a conventional, longitudinally segmented pad assembly is fabricated for use with a specific shape of stock and a specific stock diameter. A change of either stock shape or stock diameter necessitates removal and replacement of the pad assembly in its entirety, that is, of all unitary pad segments. Though superficially a jejune task of no great significance, it requires a large inventory of pads, each specifically designed for a particular stock . . . again, a great expense.

Less evident is the fact that currently available automatic screw machines are particularly designed with collets which accept only a relatively narrow range of stock diameters, i.e., each machine is designed for use with pads having inner serrations within a relatively narrow range of diameters. Thus, a machine for relatively large stock may lie idle since a particular smaller stock diameter is not usually run on that machine, simply because it is generally impractical to make conventional longitudinally segmented pads for running 0.5 in. stock in the collet of a machine with a capacity to run 4 in. stock.

The foregoing deficiencies, disadvantages and drawbacks in prior art unitary pad segments are not less readily recognizable by virtue of having become enured to them. Surprisingly, the solution to these problems appears to have consistently escaped those skilled in the art over several score years. The instant invention is directed to an improved collet pad having plural, separate, composite longitudinal segments. The pad dispenses with the necessity of carrying a large inventory of conventional pads, as is now usually done, and simultaneously permits the fabrication of a collet pad which requires no expensive broaching operation.

SUMMARY OF THE INVENTION

It is, therefore, a general object of this invention to provide a removable composite collet pad comprising at least two composite pad segments radially displaceable relative to each other, each segment comprising a removable inner member or liner having an outer surface which conforms to the inner surface of an outer member.

It is another general object of this invention to provide a removable composite pad segment including an outer member fitted with a removably secured liner having a serrated inner work-gripping surface.

It is still another general object of this invention to provide a removable composite pad segment including an outer member fitted with a choice of interchangeable liners adapted to grip stock having the same or different diameters.

It is a specific object of this invention to provide a composite pad in which only a liner with damaged or worn serrations need be replaced, and in which the outer member may be reused.

It is another specific object of this invention to provide an assembly of longitudinally sectioned composite pad segments with accurately machined liners which coact to grip a rotating bar of stock and properly center it in the spindle of a machine.

It is still another specific object of this invention to provide a composite pad segment in which both the outer member and replaceable inner member or liner may be made of relatively more expensive steel than common tool steels, or other expensive materials, since the outer member does not wear appreciably and may be used repeatedly over an extended period of time, and, the replaceable liner is relatively inexpensive.

It is yet another specific object of the instant invention to provide a method of fabricating a liner with a serrated or toothed inner surface such as is conventionally preferably used to grip a workpiece securely in an assembly of pads, irrespective of the diameter of the workpiece, utilizing only a milling or slotting machine and dispensing with the use of a wide range of broaching machines, depending upon the diameter of the workpiece to be run; broaching is now conventional practice.

It is a further specific object of this invention to provide at least two removably secured composite segments for a conventional collet, each segment having an outer member in which a quickly removable liner is positively held in place by fastening means carried in the outer member.

It is another specific object of this invention to provide plural composite collet pad segments which are removably fastened to the outer member by fastening means carried by the outer member, and which, additionally, have key means to inhibit circumferential movement of the liner relative to the outer member.

It is a still further specific object of this invention to provide a composite segment in which a liner cannot be accidentally disengaged from its respective outer member since there are no connections which can be worked loose.

It is also another specific object of this invention to provide a conventional collet with an assembly of plural, longitudinally sectioned composite pads, each of which is circumferentially split to present an outer member, a liner removably secured to the inner surface of the outer member, key means to key the liner to the outer member, and, fastening means to secure the liner to the outer member, all of which elements are capable of being inexpensively manufactured, but which do not sacrific ruggedness or reliability of the assembly.

Hereinafter the collet pad of my invention which comprises plural coacting composite pad segments will be referred to as a composite collet pad. These and other objects, features and advantages of this invention will become apparent to those skilled in the art from the following description of preferred forms thereof and the illustrations set forth herein.

BRIEF DESCRIPTION OF THE DRAWINGS

The invention is illustrated in the accompanying drawings wherein.

DETAILED DESCRIPTION OF PREFERRED EMBODIMENTS OF THE INVENTION

The composite collet pad of this invention is of the detachable pad type used in longitudinally segmented sections to form an assembly of separate pads in a collet, which pads coact to grip the work, of whatever configuration it happens to be, to permit a high-speed machining operation on the work. Typical conventional collet pads of the detachable type are integral longitudinal unit segments formed of hardened tool steel; the outer surface of each unit segment is adapted to be held in a tubular collet of the expansible type while the inner surface is provided with a roughened or serrated surface. By a serrated surface I allude to any surface provided with a multiplicity of projections which effectively bite into a piece of stock, under adequate pressure, so as to tightly secure the stock and prevent it from movement relative to the projections, until after the pressure on the collet is relieved. Conventionally, serrations on a collet pad comprise uniform teeth formed by cutting a multiplicity of circumferential, spaced apart parallel grooves in a lathe or milling machine, then cutting a multiplicity of longitudinal spaced-apart parallel grooves in one or more broaching operations. Serrations or teeth machined as described are generally pointed in a direction opposite to the direction of relative rotation of the stock, and sharp enough to bite into the stock. Such teeth are preferred on the liner of the composite pad segments of this invention, though any projections may be used which are neither sharp nor pointed provided they are effective to securely grip the work or stock during operation.

Figure 1:
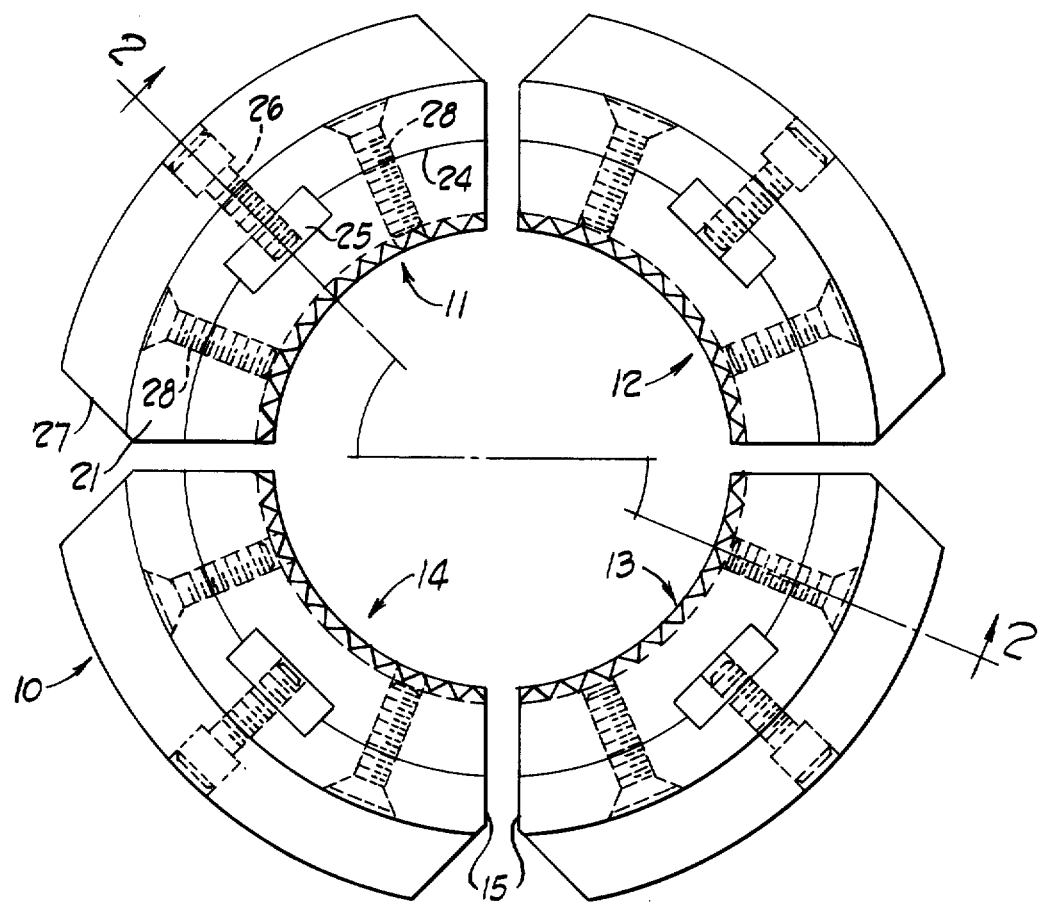
FIG. 1 is a plan view of the front face of four quarter-cylinder segments of a composite collet pad showing the liner keyed to the outer member.

Referring now to FIG. 1 there is shown a plan view of the front face of an assembly of a composite collet pad indicated generally at 10 including four quarter-cylindrical pad segments indicated generally at 11, 12, 13 and 14 as they would be assembled in a typical collet of the expansible type (not shown). These quarter-cylindrical pad segments –14 are not precisely quarter cylinders since there is material missing due to the cylindrical starting body having been cut longitudinally to form four separate segments each having a longitudinal edge portion 15. Each composite pad segment is removably mounted in a finger (not shown) of the collet, each finger being radially displaceable independently of the others. It will be understood that where stock of a symmetrical cross-section is fed through the pad assembly the fingers will be radially displaced more or less equally. It will also be understood that, absent the stock in the assembly, depending on the resiliency of the fingers of the collet, the longitudinal edge portions 15 of the pad segments may be in edge to edge contact, or in circumferentially spaced apart relationship with each other. There is nothing critical about the edge to edge spacing between pad segments with or without the stock in the assembly, but it is essential that the spacing be circumferentially expansible when the pressure on the collet is relieved, to permit the stock to be advanced through the composite pad assembly.

In the drawing, the pad semgnets 11-14 are shown as being identical, though this is not necessary. It is preferred that they be identical for reasons set forth hereinafter.

Figure 2:
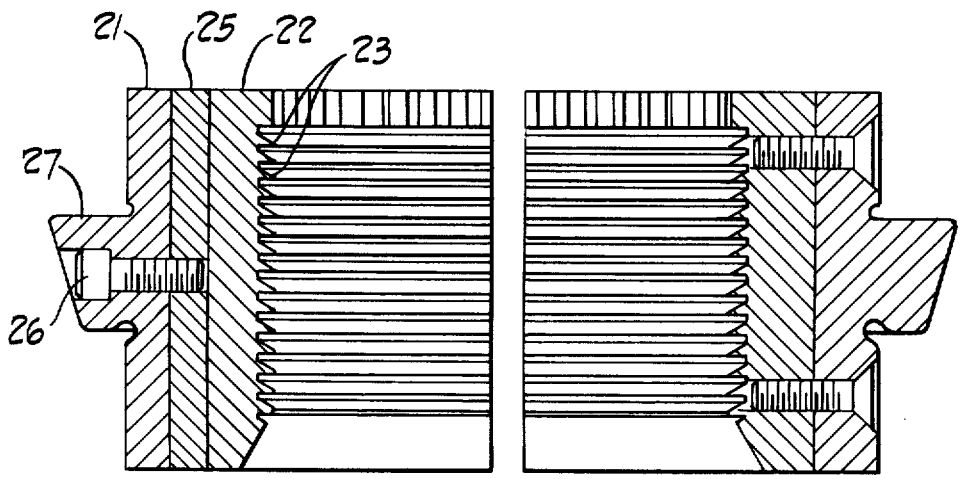
FIG. 2 is an elevation view of a staggered section along the line 2—2 in FIG. 1.

Referring more particularly to the pad segment 11, it is shown to comprise an outer member 21 and an inner member or liner 22. The inner surface of the liner 22 is provided with serrations or teeth 23, as shown in FIG. 2. The outer surface of the liner 22 conforms to the inner surface of the outer member 21. It is convenient to provide matching cylindrical surfaces, matched in the drawing along the line 24, which surfaces provide ample contact area over which to spread the machining forces to which the pad segments are subjected when the segments are in pressure-engagement with the stock. The inner surface of the outer member and the outer surface of the liner are grooved to accomodate a key 25 which inhibits circumferential shifting of the liner. The key 25 is held in position by an Allen socket head cap screw 26 threadedly secured in the key 25. The Allen screw 26 is conveniently recessed in a circumferential rib 27 projecting from the outer surface of the outer member 21. The rib 27 is a typical means for removably disposing a detachable pad segment in a collet. Any other means may be used, but rib means are preferred.

The shear forces to which the liner 22 is subjected are borne, for the most part, by the key 25, and it will be appreciated that a close fit for the key is necessary to prevent breakage of the liner 22, which being of hardened tool steel is relatively brittle. This key means for holding the liner permits the use of a relatively wide key which permits leaving an adequate amount of liner material for strength. Though a square key is illustrated for use when sufficient material is available in the liner, close-fitting cylindrical dowel pins may be used when machining costs so dictate. It will also be evident that, though a single key is illustrated for each pad segment, large pad segments may utilize plural keys for better distribution of the forces.

It will be appreciated that the liner 22 is held against circumferential shifting by the key 25 but is not positively held against radially inward shifting. This is effected by fastening means such as plural flat-head cap screws 28 recessed in the outer member 21 which screws are threadedly secured in suitably drilled and tapped holes in the liner 22. Plural screws are preferred since they additionally aid in bearing the shear stresses to which the liner is subjected.

It is not imperative, in the broadest embodiment of this invention that key means be used to inhibit circumferential relative movement between the liner and the outer member, if the fastening means used are sufficiently strong to accomplish this purpose in addition to preventing radially inward movement of the liner relative to the outer member. For example, a multiplicity of high-strength cap screws 28 profusely fastening the liner to the outer member may, in some instances, provide sufficient operating strength. Generally, however, key means of some type are preferred both for strength, and for speedy changes of liners, since the use of a key requires minimal fastening means.

Similarly, it is not imperative that the liner 22 be held against the inner surface of the outer member 21 by a fastening means such as the cap screws 28. For example, well-matched surfaces such as those indicated by the match line 24, may be adhesively secured by known adhesives of the epoxide type, inter alia, which are stable under relatively high pressures and at the elevated temperatures developed during use of the composite pad. However, detachably bonding the liner to the outer member is generally ineffective to prevent relative circumferential movement therebetween. Thus an adhesively bonded composite requires that a key means of sufficient strength be used.

When a liner is sufficiently worn, as invariably happens incident to movement of the stock through the collet, only the liner 22 is replaced. This is accomplished by removing the pad segment with the worn liner from the finger of the collet, and backing off the screws 28. A new liner is then secured to the outer member. If the pad segments are identical the liners for a particular stock diameter are freely interchangeable, which makes it possible to replace a single liner of a pad segment when the teeth of that liner are unexpectedly or accidentally damaged.

Each liner is preferably bevelled near the rear face of the pad, as shown at 29, to facilitate insertion of the stock into the assembly of pad segments. It will be evident from the manner in which the pad segments are assembled in the jaws of a collet, that replacement of a liner involves removal of a pad segment. Even where the liner is threadedly secured to the outer member, or, bayonet mounted therein, as will be more fully described hereinafter, replacement of the liner necessitates removal of the pad segment from the collet because of the close edge to edge relationship of the pad segments in the composite collet pad.

Figure 3:
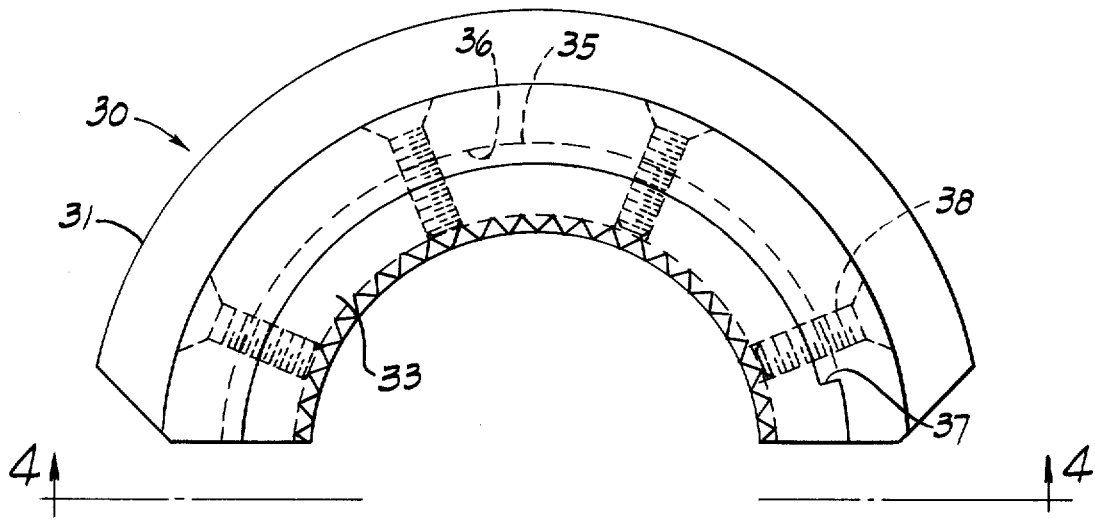
FIG. 3 is a bottom view of the rear face of two semi-cylindrical segments of a composite collet pad showing the inner liner threadedly disposed in outer member.
Figure 4:
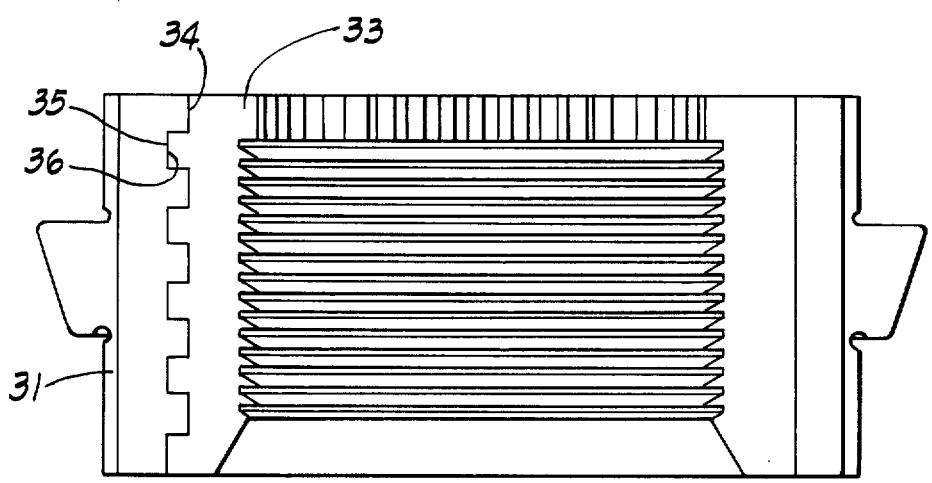
FIG. 4 is an elevation view along line 4-4 in FIG. 3.

In another embodiment of the composite pad segments of this invention, a liner may be threadedly secured to to the inner surface of the outer member of each pad segment, the threads terminating near either the front or rear face, so that the liner is locked against further movement. Referring more particularly to FIG. 3 there is shown a composite pad 30 having two essentially semicylindrical pad segments 31 and 32. Each pad segment has a liner 33 threadedly disposed in the inner surface of the outer member 34, the thread pitch and diameter being so chosen as to survive the forces to which the liner is subjected during operation. In the drawing, threads 35 are cut on the outer surface of the liner 33 and, recesses 36 for the threads 35 are cut in the inner surface of the outer member. The female threads 36 cut in the outer member 34 terminate at a ledge 37 along one edge of the pad segment. Flat head cap screws 38 are inserted through the outer member and threadedly disposed in the liner 33 to hold it against the outer member.

The foregoing threadedly secured liner and outer member described immediately hereinabove obviate the use of a key and at the same time affords sufficient strength for the purpose. It will be understood that the threads for the pad segment will be threaded in a direction such that, during operation the liners will be tightened into the outer members.

Yet another embodiment of this invention may utilize a liner and outer member which are removably secured, one against the other, with a bayonet type mount, preferably utilizing plural locking projections to withstand the shear forces during operation. Still other means for removably securing the liner to the outer member may be used depending upon the size of the pad segment, the materials from which the components are made, and the like.

It will be apparent that, where a liner is adhesively secured to the outer member, substitution of a new liner for a worn one requires that the adhesive or bonding agent be destroyed, for example by dissolving in a suitable solvent, or by heating to an elevated temperature sufficient to destroy the adhesive or bonding agent but insufficient to deleteriously affect the temper of the hardened steel.

It will also be appreciated that replaceable liners in the composite pad of this invention permits the use of much harder and more durable materials for making liners. This is particularly advantageous in those instances where a desirable liner material is too expensive to use in the time-honored manner, or where machining of the material by broaching is impractical.

The particular sequence of machining operations for making the liners and outer members of the foregoing embodiments is not critical, and will depend upon the facilities of the maker and economics of the combined operations. In one instance, for example, it may be desirable to make a liner by rough turning the outside and inside diameters of cylindrical stock having an appropriate axial bore, and, cutting and facing the stock to length. The internal circumferential grooves may then be cut with a single point tool or a gang tool. The internal longitudinal grooves are then cut with a vertical shaper or by broaching. Cutting of the circumferential and longitudinal grooves provides a multiplicity of teeth, and the grooves are cut in such a manner as to provide a desired tooth profile. Keyways are then milled into the outer surface of the liner at a location corresponding to matching keyways in the outer members of the pad segments in which the liner is to be used. Appropriate mounting holes for the cap screws are then drilled and tapped using a drill jig. The cylindrical liner is then heat-treated in a conventional manner for the particular tool steel from which it is made. The heat-treated liner is finished ground for the specified outside and inside diameters as well as for the dimensions of the keyway. The finished cylindrical liner is then cut into liner segments, and stamped for identification.

Alternatively, hollow cylindrical stock may be rough turned for inside and outside diameters, cut and faced, and the internal circumferential grooves cut as described immediately hereinabove. The keyways are then milled in the outer surface of the cylindrical liner, as before, and the liner cut into the desired number of segments. Each segment is then placed in a milling fixture and the longitudinal grooves are milled into the inner surface in such a manner as to provide the desired teeth. Mounting holes for cap screws are then drilled and tapped in a drill jig and the liner segments heat treated. The heat treated liners are then finish ground for inside and outside diameters and also for the keyway.

The outer members of the pads may be machined and cut in a conventional manner, including, of course, a keyway and mounting holes corresponding to those in the liner segments with which the outer members are to be used. It is preferred that the inner and outer diameters and the keyways of the outer members be finish ground for a close fit with the liners.

Appropriate machining operations for outer members and liners which are to be threadedly secured to each other, or, which are to be secured by bayonet mounting one with the other, will be deduced from the foregoing process operations described hereinabove, or may be arrived at without undue experimentation.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. In an assembly of longitudinally sectioned collet pad segments removably disposed in a radially expansible collet the improvement comprising plural composite pad segments including an outer member detachably inserted in said collet, an inner liner member having an outer surface matched to the inner surface of said outer member, said liner having an inner surface for gripping a workpiece when engaged therewith under sufficient pressure, and separate fastening means to detachably secure the outer surface of said liner against the inner surface of said outer member to inhibit circumferential and radially inward movement of said liner relative to said outer member.

2. An assembly of plural collet pad segments removably disposed in longitudinal edge to edge relationship in the jaws of an expansible collet so as to coactingly grip a bar of stock or workpiece in pressure engagement therewith by compressive contraction of said collet, when sufficient pressure is exerted on said jaws, each pad segment including an outer member detachably inserted in said jaws, an inner liner member having an outer surface matched to the inner surface of said outer member, said liner having a toothed inner surface machined to grip said workpiece, key means, disposed between said outer surface of said liner and said inner surface of said outer member, to inhibit circumferential movement of said liner relative to said outer member when said workpiece is gripped, and, separate fastening means to detachably secure said liner against said outer member and to inhibit radially inward movement of said liner relative to said outer member when said pressure is removed and said longitudinal edge-to-edge relationship is sufficient to permit said workpiece to be moved in said assembly.

* * * * *